United States Patent
Ramaraju et al.

(10) Patent No.: US 9,400,711 B2
(45) Date of Patent: Jul. 26, 2016

(54) CONTENT ADDRESSABLE MEMORY WITH ERROR DETECTION

(71) Applicants: Ravindraraj Ramaraju, Round Rock, TX (US); Mihir A. Pandya, Austin, TX (US); Andrew C. Russell, Austin, TX (US)

(72) Inventors: Ravindraraj Ramaraju, Round Rock, TX (US); Mihir A. Pandya, Austin, TX (US); Andrew C. Russell, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 106 days.

(21) Appl. No.: 14/251,719

(22) Filed: Apr. 14, 2014

(65) Prior Publication Data

US 2015/0293810 A1 Oct. 15, 2015

(51) Int. Cl.
*G11C 29/00* (2006.01)
*G06F 11/10* (2006.01)

(52) U.S. Cl.
CPC .................................. *G06F 11/1064* (2013.01)

(58) Field of Classification Search
CPC .................................................. G06F 11/1064
See application file for complete search history.

(56) References Cited

U.S. PATENT DOCUMENTS

| | | |
|---|---|---|
| 6,175,514 B1 | 1/2001 | Henderson et al. |
| 6,668,341 B1 | 12/2003 | Krauch et al. |
| 6,687,144 B2 | 2/2004 | Batson et al. |
| 7,023,056 B2 | 4/2006 | Liaw |
| 7,237,156 B1 | 6/2007 | Srinivasan et al. |
| 7,254,748 B1 | 8/2007 | Wright et al. |
| 7,271,451 B2 | 9/2007 | Liaw |
| 7,305,519 B1 | 12/2007 | Nagaraj |
| 7,571,371 B2 | 8/2009 | Wickeraad |
| 7,689,889 B2 | 3/2010 | Cohen |
| 7,809,980 B2 | 10/2010 | Refaeli et al. |
| 7,872,903 B2 | 1/2011 | Pedersen |
| 8,495,550 B2 | 7/2013 | Lilja |
| 2003/0202371 A1* | 10/2003 | Batson .................... G11C 15/00 365/49.17 |
| 2011/0034016 A1 | 2/2011 | Snyder et al. |
| 2011/0194325 A1* | 8/2011 | Ramaraju ........... G06F 11/1064 365/49.17 |
| 2013/0170273 A1* | 7/2013 | Rachamadugu ....... G11C 15/04 365/49.17 |

FOREIGN PATENT DOCUMENTS

WO WO2007047429 A1 4/2007
WO WO2010123940 A3 3/2011

OTHER PUBLICATIONS

Pagiamtzis Kostas, et al: "Content-Addressable Memory (CAM) Circuits and Architectures: A Tutorial and Survey", IEEE Journal of Solid-State Circuits, vol. 41, No. 3, Mar. 2006, pp. 712-727.

* cited by examiner

*Primary Examiner* — Cynthia Britt
*Assistant Examiner* — Thien D Nguyen

(57) ABSTRACT

A content addressable memory (CAM) includes a first entry which includes one or more bits, a second entry which includes one or more bits, first comparison circuitry configured to compare each bit of a comparand to a corresponding bit of the one or more bits of the first entry and to provide a hit/miss indicator in response thereto, and second comparison circuitry configured to compare each bit of the one or more bits of the first entry to a corresponding bit of the one or more bits of the second entry and to provide a fault indicator in response thereto.

18 Claims, 5 Drawing Sheets

CONTENT ADDRESSABLE MEMORY WITH ERROR DETECTION

BACKGROUND

1. Field of the Disclosure

The present disclosure relates in general to content addressable memory, and more specifically to content addressable memory with error detection.

2. Description of the Related Art

As consumers demand smaller processing devices, the integrated circuits within the devices also must shrink. As the size of the semiconductor memory devices decreases, the bit cell area also decreases, causing an increase in the possibility of soft error rate (SER) induced failures. Soft errors can occur, for example, when external energy (such as energy due to alpha particle bombardment) is imparted onto the circuit, causing bit values in a memory, such as content addressable memory (CAM), to change. These soft errors may result in multiple hit errors. Therefore, as CAM geometries continue to shrink, error detection becomes increasingly important. Additionally, it is important to reduce power consumed by error detection so that portable devices can operate for longer time periods between battery recharges.

BRIEF DESCRIPTION OF THE DRAWINGS

The benefits, features, and advantages of the present disclosure will become better understood with regard to the following description, and accompanying drawings where.

DETAILED DESCRIPTION

Embodiments of devices and methods disclosed herein provide content addressable memory (CAM) devices capable of detecting false misses and hits due to a single bit error caused by soft error rate while avoiding discharging the entire CAM when an error is detected. The CAM device includes a first group of memory cells that includes a copy of all the data stored in the CAM, and a second group of memory cells that stores an identical copy of the data in the first group of memory cells. When data is requested from the CAM device, a search is performed only on the first group of memory cells. The bits found in the search are concurrently compared to corresponding bits in the second group of memory cells. Corrective action can be taken to repair a faulty bit when a bit from the first group of memory cells does not match a corresponding bit from the second group of memory cells.

Figure 1:
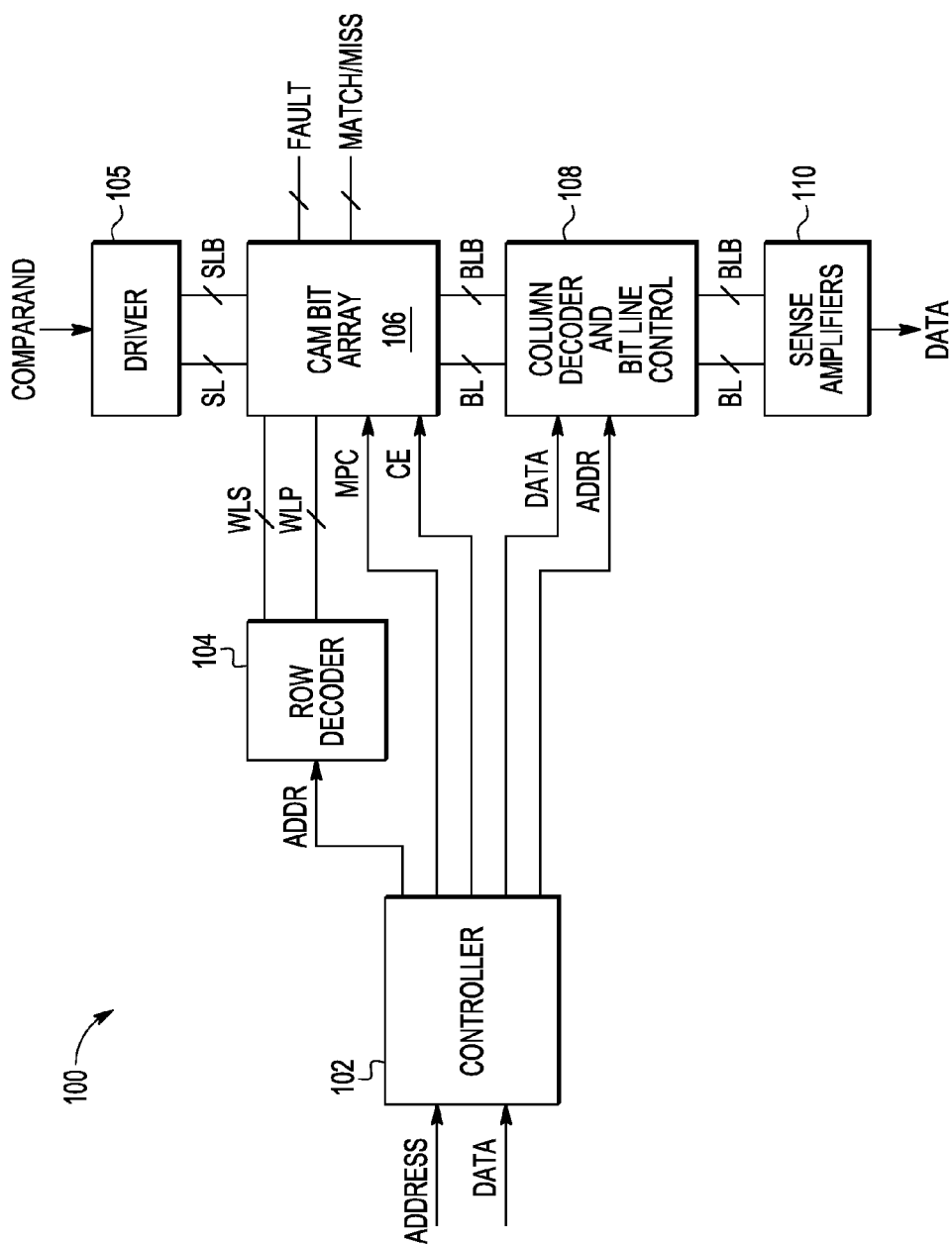
FIG. 1 is a block diagram of a content addressable memory (CAM) device according to one embodiment.

FIG. 1 is a block diagram of a content addressable memory (CAM) device 100 including a content addressable memory (CAM) device 100 according to one embodiment. CAM device 100 may be implemented as part of a System On Chip (SOC) or the like which includes at least one processor (not shown) coupled to the CAM device 100 via an appropriate interface (not shown), such as a bus or the like with multiple signals or bits. The integrated circuit device may include other circuits, modules or devices, such as other memory devices (not shown), other functional modules (not shown), and external interfaces, such as input, output or input/output (I/O) ports or pins or the like (not shown). In one alternative embodiment, the CAM device 100 is implemented alone in an integrated circuit without any other devices. In another alternative embodiment, CAM device 100 is part of a larger system on the integrated circuit.

CAM device 100 includes CAM bit array 106 coupled to controller 102, row decoder 104, comparand driver 105, and column decoder and bit line control 108. Sense amplifiers 110 are coupled to column decoder and bit line control 108 by true and complementary bit lines (BL and BLB). Controller 102 receives address and data requests/signals from a processor (not shown) and is coupled to provide address information to row decoder 104, data and address information to column decoder and bit line control 108, and match pre-charge (MPC) and compare enable (CE) indicators to CAM bit array 106. The MPC indicator is set to enable or disable a pre-charge switch (not shown) that is connected to a match comparator (not shown) for each bit cell in a row. The match comparators indicate whether the comparand matches data stored in corresponding bit cells. The CE indicator is used to control operation of the match comparators.

Column decoder and bit line control 108 is coupled to CAM bit array 106 by true and complementary bit lines (BL and BLB). Primary and secondary word lines (WLP and WLS) are coupled between row decoder 102 and respective primary and secondary sections of CAM array 106. Comparand driver 105 is coupled to CAM bit array 106 by true and complementary search lines (SL and SLB). CAM bit array 106 provides FAULT indicators that are set to indicate whether there is a difference between corresponding data words in the primary and secondary areas of CAM bit array 106. CAM bit array 106 further provides match or miss indicators that are set to indicate whether there is a difference between a comparand and a corresponding data word in the primary area of CAM bit array 106.

Controller 102 controls read and write operations of the CAM bit array 106 through row decoder 104 and column decoder and bit line control 108, such as in response to requests from one or more processors. CAM controller 102 accesses memory cells within CAM bit array 106 by providing a row address to the row decoder 104 and a column address to column decoder and bit line control 108. Data is written into or read from the CAM bit array 106 via column decoder and bit line control 108.

Bit lines $BL_{0-J}$ and complementary bit lines $BLB_{0-J}$ are coupled between CAM array 106 and column decoder and bit line control 108, and between sense amplifiers 110 and column decoder and bit line control 108. Sense amplifiers 110 provide data from CAM array 106 to one or more processors.

CAM 100 can be used in many different applications such as data routing systems (e.g., switches and routers) to look up addresses of the packets that flow through the switches and to correlate incoming data addresses to communication channel outputs so that data is quickly routed through telecom systems. This includes MAC address lookup for Ethernet switching, ATM VPI/VCI lookup for ATM switches and IP address lookup in routers. CAM 100 can also be used for classification of packets and other diverse applications such as pattern matching, voice recognition, data compression, branch target address cache or MMUs inside a microprocessor, etc.

One type of CAM architecture is referred to as the binary CAM. The binary CAM stores different N bit tags in many different rows of memory in the CAM. During operation, the CAM is provided with N bit compare values and compares these N bit compare values with the N bit tags in order to determine if there is a match in the CAM. In order for a hit or match to occur in the CAM, every bit in the N bit tag must match an associated bit within the same bit position of the N bit data value.

Another CAM architecture is referred to as ternary CAM and is used when certain fields of the addresses are masked. In a ternary CAM, N bit tags that are stored within the CAM may be compared against input values that have been masked by a mask value. The mask value creates "don't care" bits within the compare value so that a hit can occur in the ternary CAM even when only some of the tag bits stored with the ternary CAM match the input compare value.

Figure 2:
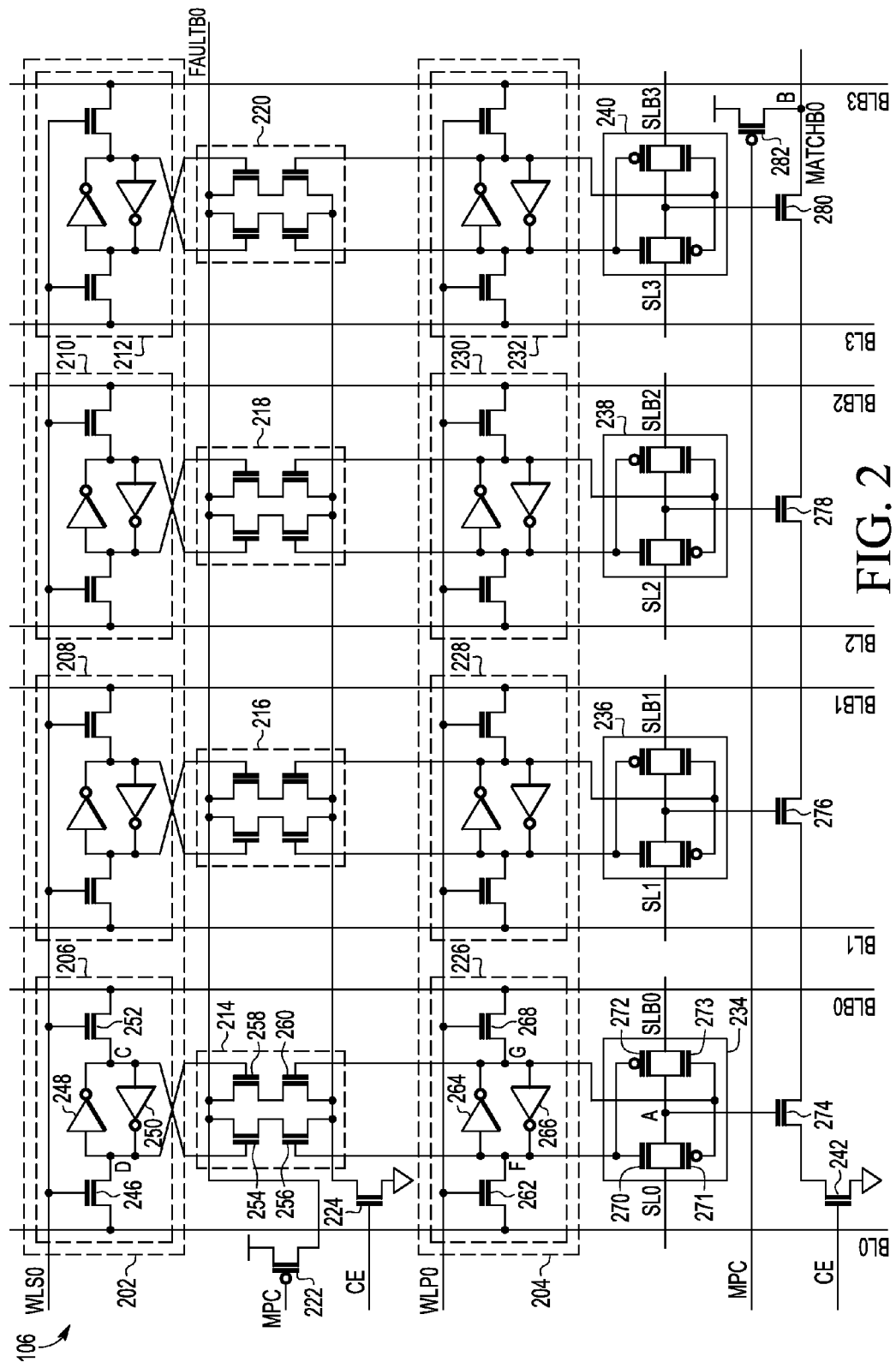
FIG. 2 is a schematic diagram of an embodiment of a CAM bit array that may be used in the CAM device of FIG. 1.

FIG. 2 is a schematic diagram of an embodiment of a binary CAM array 106 that may be used in the CAM device 100 of FIG. 1. As shown, binary CAM array 106 includes a primary group 204 of memory cells 226-232 arranged in a row and a secondary group 202 of memory cells 206-212 arranged in another row. Primary group 204 includes a row of four memory cells 226, 228, 230, 232 and secondary group 202 also includes a row of four memory cells 206, 208, 210, 212, however, CAM array 106 can include any suitable number of memory cells and any suitable number of rows and columns. Primary group 204 and secondary group 202 generally have the same number of memory cells. When write data is received, the write data is stored in a selected primary entry composed of a number of memory cells 226-232, and in a shadow entry composed of a number of memory cells 206-212 that correspond to the memory cells 226-232 of the selected primary entry.

The bits in the incoming comparand data is compared to data in corresponding bits of memory cells 226-232 in the primary group 204 using a corresponding one of match comparators (also referred to as comparison circuits) 234, 236, 238, 240. The output of match comparators 234-240 is tied together to provide the MATCH or hit/miss indicator, which indicates whether the data in at least one of the memory cells in the primary group 204 does not match a corresponding bit in the comparand.

The data in each of the cells in the primary group 204 is compared to the data in a corresponding one of the cells in the secondary group 202 using a corresponding one of fault comparators (also referred to as comparison circuits) 214, 216, 218, 220. The output of fault comparators 214-220 is tied together to provide a first complementary fault (FAULTB0) indicator, which indicates whether the data in at least one of the memory cells in the primary group 204 does not match the data in a corresponding one of the memory cells in the secondary group 202.

Each of memory cells 206-212 includes a pair of cross-coupled inverters 248, 250, with the output of inverter 250 coupled to the input of inverter 248, and the output of inverter 248 coupled to the input of inverter 250. Access transistor 246 has a drain electrode coupled to first true bit line BL0, a gate electrode coupled to first secondary word line WLS0, and a source electrode coupled between the output of inverter 250 and the input of inverter 248. Access transistor 252 has a drain electrode coupled to first complementary bit line BLB0, a gate electrode coupled to first secondary word line WLS0, and a source electrode coupled between the input of inverter 250 and the output of inverter 248.

Each of memory cells 226-232 includes a pair of cross-coupled inverters 264, 266, with the output of inverter 266 coupled to the input of inverter 264, and the output of inverter 264 coupled to the input of inverter 266. Access transistor 262 has a drain electrode coupled to first true bit line BL0, a gate electrode coupled to first primary word line WLP0, and a source electrode coupled between the output of inverter 266 and the input of inverter 264. Access transistor 268 has a drain electrode coupled to first complementary bit line BLB0, a gate electrode coupled to a first primary word line WLP0, and a source electrode coupled between the input of inverter 266 and the output of inverter 264.

Each of fault comparators 214-220 includes four N-channel transistors 254, 256, 258, 260. The drain electrodes of transistors 254 and 258 are coupled to one another and to a drain electrode of P-channel transistor 222. Source electrodes of transistors 256 and 260 are coupled together, and the source electrodes of transistors 254, 258 are coupled to the drain electrodes of respective transistors 256, 260. The gate electrode of transistor 254 is coupled to the output of inverter 248. The gate electrode of transistor 258 is coupled to the output of inverter 250. The gate electrode of transistor 256 is coupled to the output of inverter 266. The gate electrode of transistor 260 is coupled to the output of inverter 264.

The drain electrodes of transistors 254 and 258 in each of fault comparators 214-220 are coupled to one another as well as to each of the other drain electrodes of transistors 254 and 258 in fault comparators 216-220. A complementary fault (FAULTB0) indicator can be detected at the end of the connection of the drain electrode of transistor 258 in fault comparator 220, and to the drain electrode of P-channel transistor 222.

The source electrodes of transistors 254 and 258 in each of fault comparators 214-220 are coupled to one another as well as to each of the other source electrodes of transistors 254 and 258 in fault comparators 216-220, and to the drain electrode of N-channel transistor 224. Transistor 222 has a source electrode coupled to a supply voltage such as VDD, a gate electrode coupled to the match pre-charge (MPC) indicator from controller 102 (FIG. 1). A gate electrode of N-channel transistor 224 is coupled to the compare enable (CE) indicator from controller 102 and a source electrode of N-channel transistor 224 is coupled to ground.

Each of match comparators 234-240 includes N-channel transistors 270, 273 and P-channel transistors 271, 272 configured as an XNOR logic circuit. A source electrode of transistor 271 is coupled to a source electrode of transistor 270 and to a corresponding comparand search line (e.g., SL0 for match comparator 234, SL1 for match comparator 236, SL2 for match comparator 238, and SL3 for match comparator 240). A drain electrode of transistor 270 is coupled to a drain electrode of transistor 271.

A source electrode of transistor 272 is coupled to a source electrode of transistor 273 and to a corresponding complementary search line (e.g., SLB0 for match comparator 234, SLB1 for match comparator 236, SLB2 for match comparator 238, and SLB3 for match comparator 240). A drain electrode of transistor 272 is coupled to a drain electrode of transistor 273. The output of transistor pair 270/271 is coupled to the output of transistor pair 272/273 at node A.

The gate electrodes of transistors 270 and 272 are coupled to the output of inverter 266 and to the gate electrode of transistor 256. The gate electrodes of transistors 271 and 273 are coupled to the output of inverter 264 and to the gate electrode of transistor 260.

Each of match comparators 234, 236, 238, 240 is coupled to a respective match switch 274, 276, 278, 280, shown as N-channel transistors, but could be implemented using one or more other suitable devices. The gate electrodes of match switches 274-280 are coupled to the node A of respective match comparators 234-240. A source electrode of match switch 274 is coupled to a drain electrode of a CE switch 242, which is shown as an N-channel transistor. A source electrode of CE switch 242 is coupled to ground and a gate electrode of CE switch 242 is couple to the CE indicator from controller 102 (FIG. 1). Match switches 274, 276, 278, 280 are coupled in series so the drain electrodes of match switches 274, 276, 278 are coupled to source electrodes of respective match switches 276, 278, 280. A drain electrode of match switch 280 is coupled to a drain electrode of pull-up P-channel transistor 282 at Node B. The source electrode of transistor 282 is coupled to a supply voltage such as VDD and the gate electrode of transistor 282 is coupled to the MPC indicator from controller 102. A complementary match (MATCHB0) (also referred to as hit/miss) indicator can be detected at Node B.

During a compare operation, fault comparators 214-220 and match comparators 234-240 operate concurrently. The match precharge (MPC) and CE indicators are set LOW to place P-channel transistors 222 and 282 in conducting mode to charge the FAULTB0 and MATCHB0 indicators HIGH. Once the FAULTB0 and MATCHB0 indicators are precharged, the compare enable indicator can be set HIGH to place N-channel transistors 224, 242 in conducting mode. For match comparators 234-240, if the bits in the comparand (as applied on search lines SL0/SLB0, SL1/SLB1, SL2/SLB2, SL3/SLB3) match the corresponding bits in the primary group 204 of memory cells 226-232, the output at node A of match comparators 234-236 will be HIGH, placing all the match switches 274-280 in conducting mode. The voltage at node B will be pulled LOW when the CE indicator is high, which places compare transistor 242 in conductive mode. The complementary match indicator (MATCHB0) at node B will accordingly be LOW, and the true match indicator (MATCH0) will be HIGH, indicating a match in the data.

If one or more of the bits in the comparand (as applied on search lines SL0/SLB0, SL1/SLB1, SL2/SLB2, SL3/SLB3) do not match the corresponding bits in the primary group 204 of memory cells 226-232, the output at node A of match comparators 234-236 with mismatched data will be LOW, placing the match switches 274-280 with mismatched data in non-conducting mode. The voltage at node B will be pulled HIGH even when the CE indicator is HIGH because the path to ground through compare transistor 242 will be shut off by one or more of match switches 274-280 with mismatched data being in non-conductive mode. The complementary match indicator (MATCHB0) at node B will accordingly be HIGH, and the true match indicator (MATCH0) will be LOW, indicating a mismatch in the data.

When the CE indicator is HIGH, the bits in the comparand are compared to the bits in the primary group 204 of memory cells 226-232. Simultaneously, the bits in the primary group 204 of memory cells 226-232 are compared to the bits in the second group 202 of memory cells 206-212 using fault comparators 214-220. The gate electrodes of transistors 254-260 in fault comparators 214-220 are coupled to respective storage nodes of memory cells 206-212 and 226-232. Note that the nodes D and E of secondary memory cells 206-212 are cross-coupled to gate electrodes of transistors 254 and 258 opposite to the coupling of nodes F and G to gate electrodes of transistors 256 and 260.

When the data in secondary memory cells 206-212 is not the same as the data in primary memory cells 226-232, one pair of transistors 254/256 and 258/260 will be in conductive mode causing the FAULTB0 indicator to be pulled LOW through transistor 224. The true fault indicator (FAULT0) will be HIGH, indicating a fault in the data. When there is a match in the data between secondary memory cells 206-212 and primary memory cells 226-232, one transistor in each pair of transistors 254/256 and 258/260 will be in non-conductive mode to prevent the complementary FAULTB0 indicator from being pulled LOW. The true fault indicator (FAULT0) will be LOW, indicating the data in primary memory cells 226 does match the data in the secondary memory cells 206-212.

If the comparand matches the data in primary memory cells 226-232 when the FAULTB0 indicator indicates there is a fault, a false hit may be indicated. If the comparand does not match the data in primary memory cells 226-232 when the FAULTB0 indicator indicates there is a fault, a false miss may be indicated. In either case of a potential false miss or a false hit, action can be taken to correct the discrepancy between the primary memory cells 226-232 and secondary memory cells 206-212, as required.

Note that device 100 saves power by eliminating the need to compare the data in both the primary and secondary groups 204, 202 of memory cells with the comparand, and then with one another. Instead the primary group 204 are compared to the comparand and the secondary group 202 is simultaneously compared with the primary group 204, eliminating the need to directly compare the comparand with the secondary group 202.

Figure 3:
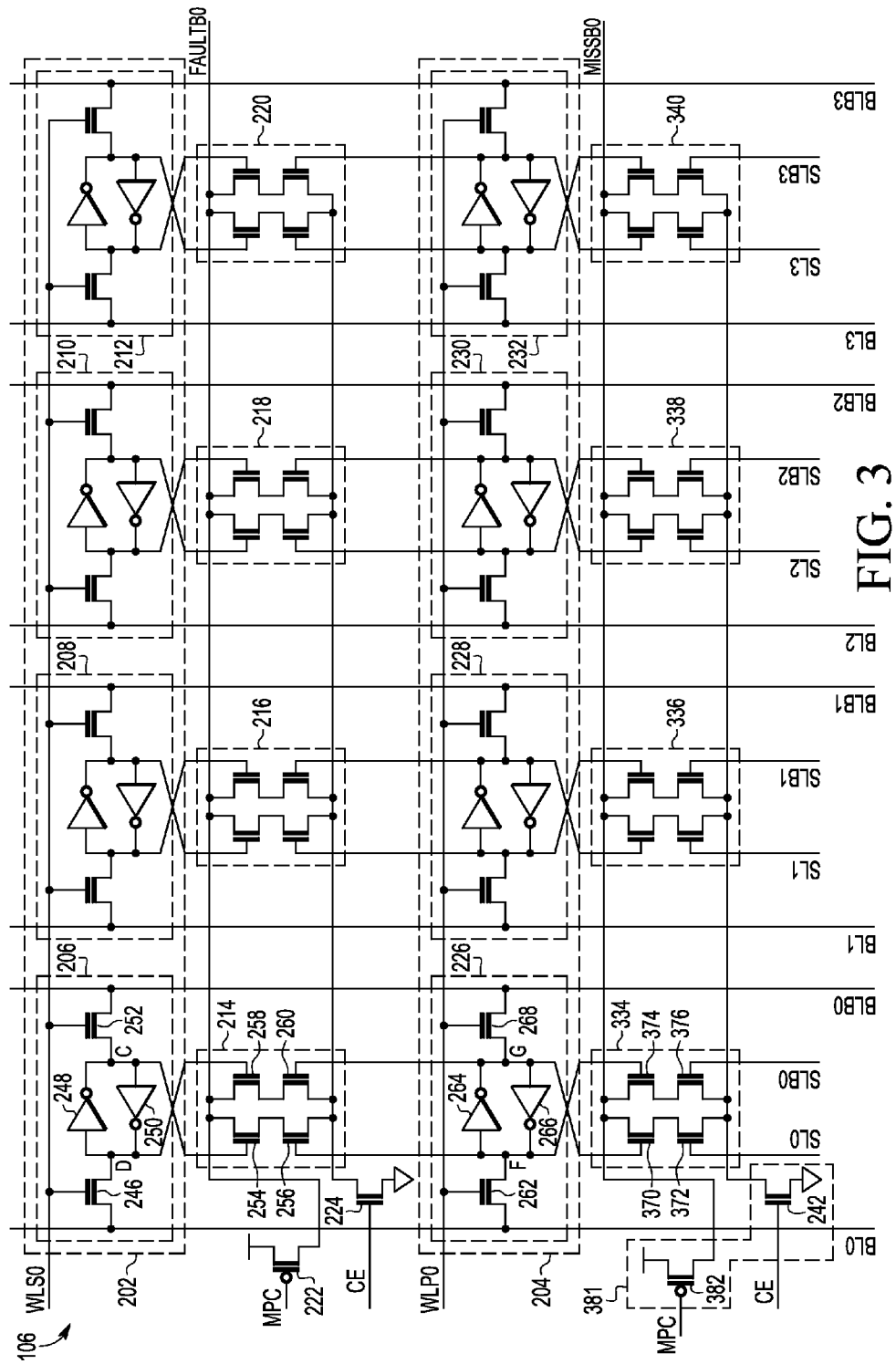
FIG. 3 is a schematic diagram of another embodiment of a CAM bit array that may be used in the CAM device of FIG. 1.

FIG. 3 is a schematic diagram of another embodiment of a binary CAM bit array 106 that may be used in the CAM device 100 of FIG. 1. CAM bit array 106 of FIG. 3 is similar to CAM bit array 106 of FIG. 2 with the exception that match comparators 234-240 of FIG. 2 have been replaced with miss comparators 334-340.

Each of miss comparators 334-340 includes four N-channel transistors 370, 372, 374, 376. The drain electrodes of transistors 370 and 374 in match comparator 334 are coupled to one another as well as the drain electrodes of transistors 370 and 374 in each of the other match comparators 336-340 and the drain electrode of P-channel transistor 382. The source electrodes of transistors 372 and 376 are coupled to one another. The source electrodes of transistors 370, 374 are coupled to the drain electrodes of respective transistors 372, 376.

The gate electrode of transistor 370 is coupled to the output of inverter 264. The gate electrode of transistor 374 is coupled to the output of inverter 266. The gate electrode of transistor 372 is coupled to a true search line (e.g., SL0 for match comparator 334, SL1 for match comparator 336, SL2 for match comparator 338, and SL3 for match comparator 340). The gate electrode of transistor 376 is coupled to a complementary search line (e.g., SLB0 for match comparator 334, SLB1 for match comparator 336, SLB2 for match comparator 338, and SLB3 for match comparator 340). The drain electrodes of transistors 372 and 376 in all of match circuits 334-340 are coupled to one another.

A first complementary miss indicator (MISSB0) can be detected at the end of the connection of the drain electrode of transistor 374 in miss comparator 340.

The source electrodes of transistors 370 and 374 in each of match comparators 334-340 are coupled to one another as well as to each of the other source electrodes of transistors 370 and 374 in miss comparators 336-340, and to a drain electrode of N-channel transistor 242. Transistor 382 has a source electrode coupled to a supply voltage such as VDD, a gate electrode coupled to the match pre-charge (MPC) indicator from controller 102 (FIG. 1), and a drain electrode coupled to a drain electrodes of transistors 370 and 374 in match comparators 334-340. A gate electrode of transistor 242 is coupled to the compare enable (CE) indicator from controller 102 and a source electrode of transistor 242 is coupled to ground.

During a compare operation, fault comparators 214-220 and miss comparators 334-340 operate concurrently. The MPC and CE indicators are set LOW to place P-channel transistors 222 and 282 in conducting mode and precharge the FAULTB0 and MISSB0 indicators HIGH. Once the FAULTB0 and MISSB0 indicators are precharged, the CE indicator can be set HIGH to place N-channel transistors 224, 242 in conducting mode.

When the CE indicator is HIGH, the bits in the comparand are compared to the bits in the primary group 204 of memory cells 226-232 using match comparators 334-340. Simultaneously, the bits in the primary group 204 of memory cells 226-232 are compared to the bits in the secondary group 202 of memory cells 206-212 using fault comparators 214-220.

When the data in comparand search lines (SL0/SL0B to SL3/SL3B) is the same as the data in primary memory cells 226-232, each pair of transistors 370/372 and 374/376 will be in non-conductive mode to prevent the complementary MISSB0 indicator from being pulled LOW. The true miss indicator (MISS0) will be LOW, indicating a match in the data. When there is a mismatch in the data between comparand search lines (SL0/SL0B to SL3/SL3B) and primary memory cells 226-232, one pair of transistors 370/372 and 374/376 will be in conductive mode to causing the complementary MISSB0 indicator to be discharged LOW through transistor 242. The true miss indicator (MISS) will be HIGH, indicating the data in primary memory cells 226 does not match the data in the comparand search lines (SL0/SL0B to SL3/SL3B).

If the MISS0 indicator indicates there is a mismatch, the data in the comparand does not match the data in the primary memory cells 226-232. If the comparand matches the data in primary memory cells 226-232 when the FAULTB0 indicator indicates there is a fault, a false hit may be indicated. If the comparand does not match the data in primary memory cells 226-232 when the FAULTB0 indicator indicates there is a fault, a false miss may be indicated. In either case of a potential false miss or a false hit, action can be taken to correct the discrepancy between the secondary memory cells 214-220 and primary memory cells 226-232, as required.

Figure 4:
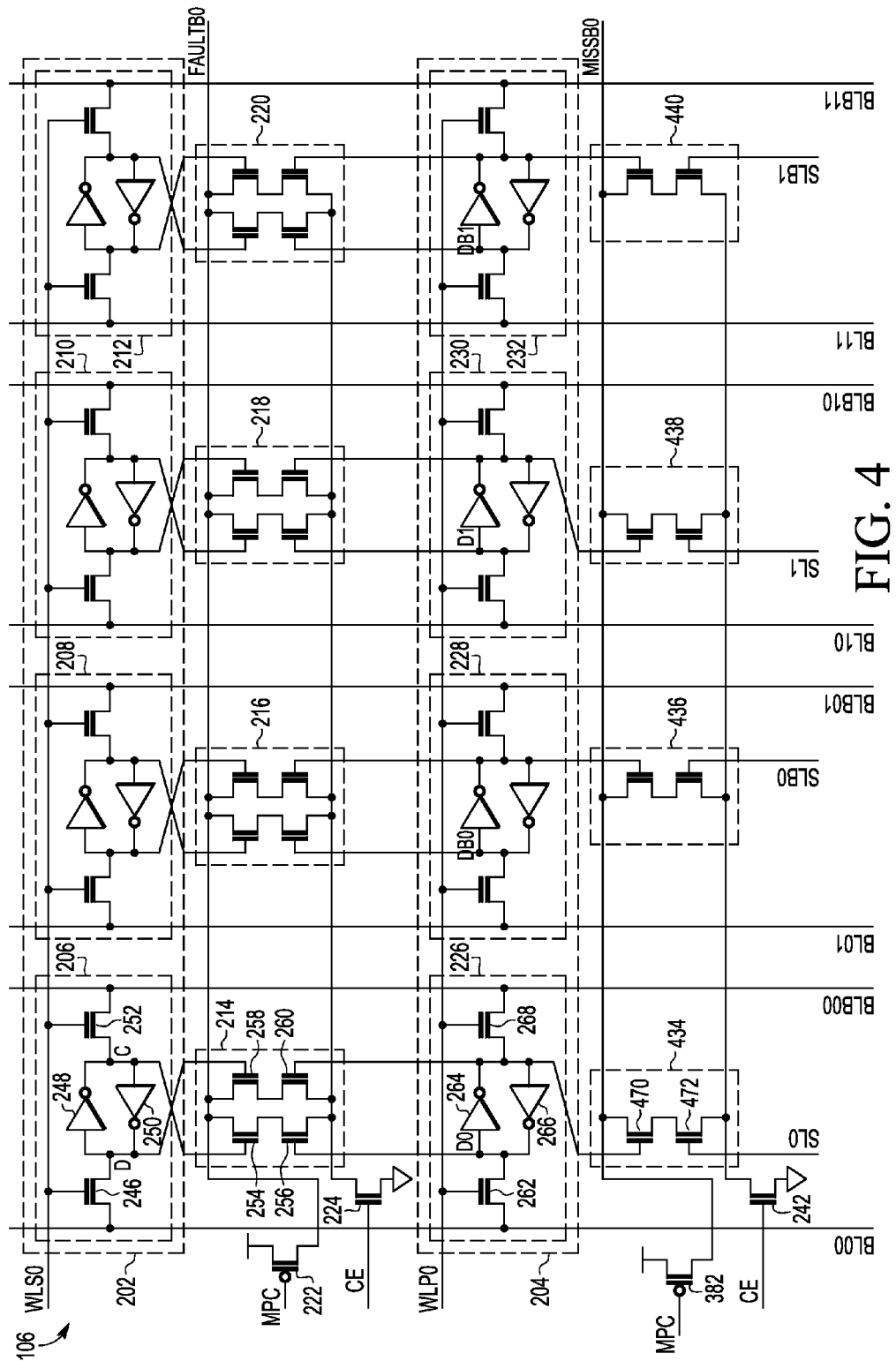
FIG. 4 is a schematic diagram of another embodiment of a CAM bit array that may be used in the CAM device of FIG. 1.

FIG. 4 is a schematic diagram of an embodiment of a ternary CAM bit array 106 that may be used in the CAM device 100 of FIG. 1. The primary memory cells 226-232, fault circuits 214-220 and secondary memory cells 206-212 of ternary CAM bit array 106 of FIG. 4 are similar in structure and function to primary memory cells 226-232, fault circuits 214-220 and secondary memory cells 206-212 of binary CAM bit array 106 of FIG. 2. However, two bit cells are used to store each piece of data because ternary CAM cells 206-212 and 226-232 can store any one of three values: a logic HIGH, a logic LOW, or a "don't care" or mask value. When storing logic HIGH and logic LOW values, ternary CAM cells 206-212 and 226-232 operate like a binary CAM cell. In addition, a ternary CAM cell 206-212 and 226-232 storing a mask value will provide a match condition for any data bit value applied to that CAM cell 206-212 and 226-232. This mask capability allows CAM array 106 to indicate when a data value matches a selected group of ternary CAM cells 206-212 and 226-232 in a row of the CAM array 106. For example, each row of a ternary CAM array 106 is shown with two ternary CAM cells 206-212 and 226-232. With regard to the primary group 204, assume the first ternary CAM cells 206-208 and 226-228 of each row each stores one of the three values a logic HIGH, a logic LOW value and a "don't care" (for comparison to the first two bits of a 2-bit comparand) and similarly the last ternary CAM cells 210-212 and 230-232 of each row stores one of three values. Under these conditions, when a 2-bit comparand is applied to the ternary CAM array 106, a match occurs for each row of the CAM array 106 in which the data values stored in the first two ternary CAM cells 206-212 and 226-232 match the first two bits of the 2-bit comparand. The ternary CAM described stores encoded data and a mask value that can be applied for separate data and mask bit ternary CAM.

Match comparators 234-240 of FIG. 2 have been replaced with miss comparators 434-440 that each includes a pair of N-channel transistors 470, 472. The drain electrode of transistor 470 is coupled to a drain electrode of P-channel transistor 382 and the source electrode of transistor 470 is coupled to the drain electrode of transistor 472. The drain electrode of transistor 470 in match circuits 434-440 are also coupled to one another. The MISSB0 indicator is detectable at the drain electrode of transistor 470 in match comparator 240.

The source electrode of transistor 472 is coupled to the drain electrode of transistor 242. The gate electrode of transistor 470 is coupled to the output of inverter 264. Search lines SL0 and SL1 are coupled to gate electrodes of transistors 472 of respective match comparators 434, 438 and complementary search lines SLB0 and SLB1 are coupled to gate electrodes of transistors 472 of respective match comparators 436 and 440. The gate electrode of transistor 382 is coupled to the MPC indicator and the source electrode of transistor 382 is coupled to a voltage supply such as VDD. The gate electrode of transistor 242 is coupled to the CE indicator and the source electrode of transistor 242 is coupled to ground.

In some situations, the mask features enables only the most important or selected bits in a comparand to be compared to corresponding bits of memory cells in the primary group 204. Accordingly, the comparand and entries in the primary and secondary groups 204, 202 can include both data and mask information that indicates which bits to compare. Both the data and mask information of the primary and secondary group are compared to detect any mismatch between primary and secondary.

When the CE indicator is HIGH, the bits in the comparand are compared to the bits in the primary group 204 of memory cells 226-232 using miss comparators 434-440. Simultaneously, the bits in the primary group 204 of memory cells 226-232 are compared to the bits in the second group 202 of memory cells 206-212 using fault comparators 214-220. The gate electrodes of transistors 254-260 in fault comparators 214-220 are coupled to respective storage nodes of memory cells 206-212 and 226-232.

During operation, the MPC indicator is set LOW to precharge the MISSB0 and FAULTB0 indicators. When the CE indicator is set HIGH and the data in a primary memory cell 226-228 or 230-232 is the same as the data in a corresponding search line (SL0-SL0B to SL1-SL1B), or is masked, one of the transistor in transistors 470/472 of miss comparator 434, 436,438 and 440 will be in non-conductive mode and the MISSB0 indicator will remain HIGH. The MISS0 indicator will be LOW, indicating a match. When there is a mismatch in the data between primary memory cells 226-228 or 230-232 and search lines (SL0/SL0B to SL1/SL2B), one pair of transistors 470-472 of miss comparator 434,436,438 and 440 will be in conductive mode, discharging the MISSB0 indicator LOW through transistor 242. The MISS0 indicator will be asserted HIGH to indicate a mismatch.

If the MISS0 indicator indicates there is a mismatch, the data in the comparand does not match the data in the primary memory cells 226-232. If the comparand matches the data in primary memory cells 226-232 when the FAULTB0 indicator indicates there is a fault, a false hit may be indicated. If the comparand does not match the data in primary memory cells 226-232 when the FAULTB0 indicator indicates there is a fault, a false miss may be indicated. In either case of a potential false miss or a false hit, action can be taken to correct the discrepancy between the secondary memory cells 214-220 and primary memory cells 226-232, as required.

Figure 5:
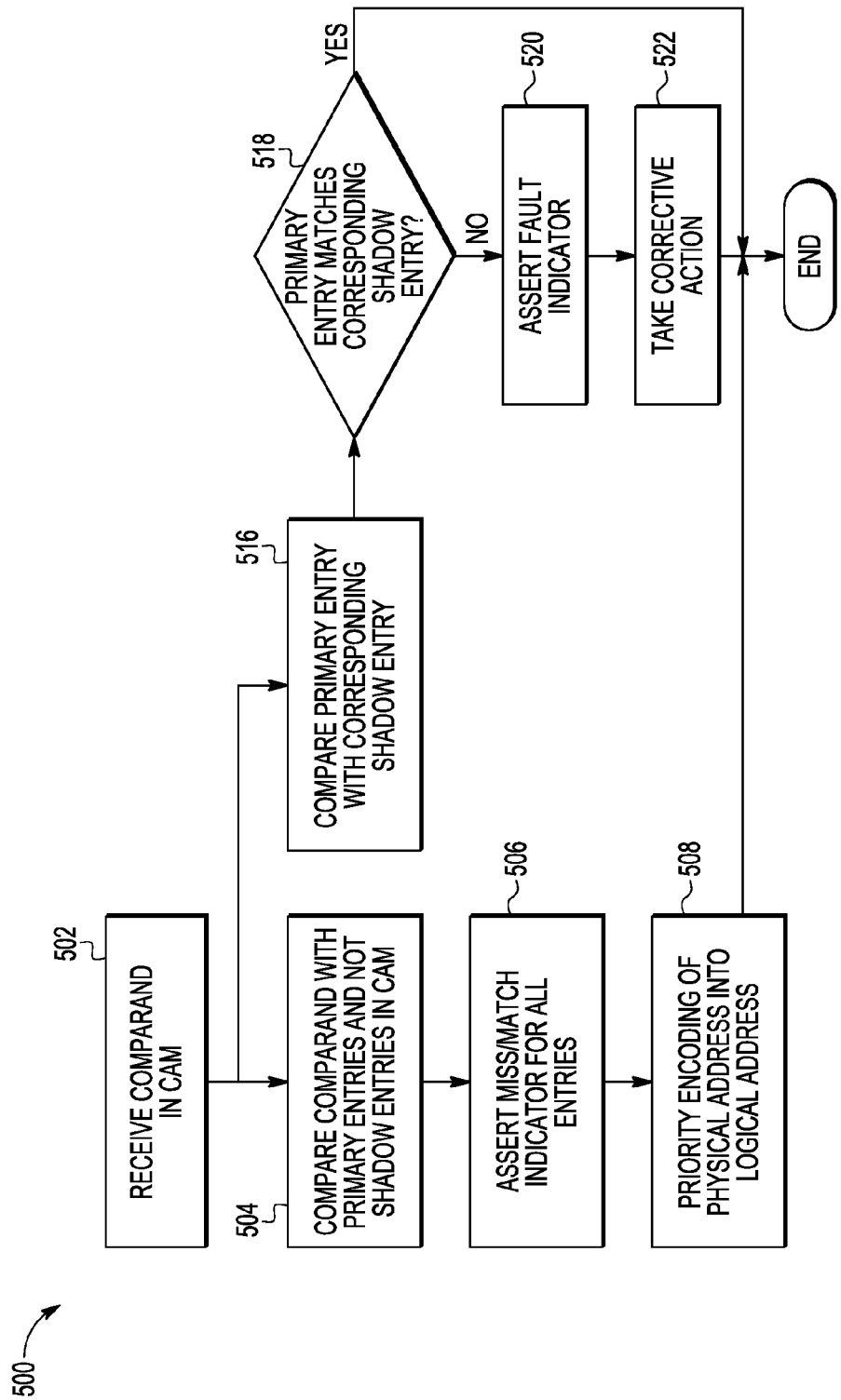
FIG. 5 is a flow diagram of an embodiment of a method for operating the CAM device of FIG. 1.

FIG. 5 is a flow diagram of an embodiment of a method 500 for operating the CAM device 100 of FIG. 1. In process 502, a comparand is received in the CAM device and provided to match circuits. Process 504 includes comparing the comparand only with data in a primary group of memory cells. The comparand is not compared directly with a secondary or shadow group of memory cells. For each bit of the comparand, if there is a match with a corresponding bit in the primary group of memory cells, a match indicator is asserted in process 506. If there is not a match, a miss indicator is asserted in process 506. Process 508 includes priority encoding the physical address of the matching entry into a logical address of the matching entry in the primary group of memory cells.

Processes 504-508 are executed simultaneously with processes 516-524, during which the data in the secondary group of memory cells is compared with data in the primary group of memory cells. In particular, process 516 includes comparing the primary entry with a corresponding entry in the secondary or shadow group of memory cells. Process 518 determines whether the entry in the primary group of memory cells matches the corresponding entry in the secondary group of memory cells. If there is not a match, process 520 includes asserting a fault indicator and process 522 includes taking corrective action to determine whether there is problem with the data in the primary and/or secondary entries. For example, the data that should be in the primary and secondary entries can be restored in the CAM device 100. If there is a match, or if there is no match and process 522 has completed, process 518 transitions to end method 500 at process 524.

By now it should be appreciated that systems and methods have been disclosed that In some embodiments, a content addressable memory (CAM) that can include a first entry (204, 304, 404) that includes one or more bits, a second entry (202, 302, 402) that includes one or more bits, first comparison circuitry (234-240, 334-340) configured to compare each bit of a comparand to a corresponding bit of the one or more bits of the first entry and to provide a hit/miss indicator in response thereto, and second comparison circuitry (214-220, 314-320) configured to compare each bit of the one or more bits of the first entry to a corresponding bit of the one or more bits of the second entry and to provide a fault indicator in response thereto.

In another aspect, the fault indicator can indicate a fault when a mismatch occurs between the first entry and the second entry.

In another aspect, the second comparison circuitry can comprise a plurality of comparators (214-220, 314-320), each comparator having a first input coupled to a data node (output of 264, 364 or 266, 366) of a bit location of the first entry, a second input coupled to a data node (output of 248, 348 or 250, 350) of a corresponding bit location of the second entry, and can be configured to discharge the fault indicator when a mismatch occurs between the bit location of the first entry and the bit location of the second entry.

In another aspect, each comparator can be configured to not discharge the fault indicator when a mismatch does not occur between the bit location of the first entry and the bit location of the second entry.

In another aspect, the first comparison circuitry can comprise a plurality of comparators (234-240, 334-340), each comparator having a first input coupled to a data node (output of 264, 364 or 266, 366) of a bit location of the first entry and a second input coupled to a bit location of the comparand (SL), and is configured to discharge the hit/miss indicator when a mismatch occurs between the bit location of the first entry and the bit location of the comparand.

In another aspect, the first comparison circuitry and the second comparison circuitry can be configured to concurrently provide the fault indicator and hit/miss indicator in response to a comparand received by the first comparison circuitry.

In another aspect, the one or more bits of the first entry (404) can comprise data and mask information, and the one or more bits of the second entry (402) comprises data and mask information.

In another aspect, the first comparison circuitry can be configured to compare each bit of the comparand to a corresponding bit of the one or more bits as selected by the mask information to provide the hit/miss indicator in response thereto.

In another aspect, the first entry is one of a plurality of primary entries of the CAM and the second entry is one of a plurality of shadow entries of the CAM. Each of the primary entries has a corresponding shadow entry. The CAM can further comprise write circuitry (102) configured to store write data into a selected primary entry of the plurality of entries. When the write circuitry stores write data to a selected primary entry of the plurality of primary entries, the write circuitry is configured to store the write data to the shadow entry corresponding to the selected primary entry.

In another aspect, the first comparison circuitry can be configured as one of a NOR and a NAND configuration.

In other embodiments, a content addressable memory (CAM) can comprise a plurality of primary entries (204, 304, 404) each comprising one or more primary bits and a plurality of shadow entries (202, 302, 402) each comprising one or more shadow bits. Each primary entry can have a corresponding shadow entry. A method for using the CAM can comprise receiving (502) a comparand, comparing (504) each bit of the comparand to a corresponding bit of the one or more primary bits of a first primary entry of the plurality of primary entries, comparing (516) each bit of the one or more primary bits of the first primary entry to a corresponding bit of the one or more shadow bits of a first shadow entry of the plurality of shadow entries, providing a match indicator (506, 508, 512) corresponding to the first primary entry in response to the comparing each bit of the comparand to the corresponding bit of the one or more primary bits of the first primary entry to indicate whether a match occurred between the first primary entry and the comparand, and providing a fault indicator (518, 520) corresponding to the first shadow entry in response to the comparing each bit of the one or more primary bits of the first primary entry to the corresponding bit of the one or more shadow bits of the first shadow entry to indicate a fault when a mismatch occurs between the first shadow entry and the first primary entry.

In another aspect, the comparing can be performed concurrently.

In another aspect, the providing the fault indicator can comprise discharging the fault indicator in response to a mismatch between the first shadow entry and the first primary entry. The providing the match indicator can comprise discharging the match indicator in response to a mismatch between the first primary entry and the comparand.

In another aspect, the method can further comprise receiving write data, selecting a primary entry of the plurality of primary entries, storing the received write data to the selected primary entry, and storing the received write data to the shadow entry corresponding to the selected primary entry.

In another aspect, at least one of the primary entries can include data information and mask information and at least one of the shadow entries can include data information and mask information. Comparing each bit of the comparand to a corresponding bit of the one or more primary bits of a first primary entry of the plurality of primary entries can be performed such that the one or more primary bits of the first primary entry is indicated by the mask information.

In still further embodiments, content addressable memory (CAM) can comprise a first entry (404) having one or more bits including data information and mask information, a second entry (402) having data information and mask information. First comparison circuitry (434-440) can be configured to compare a comparand to the first entry and to provide a hit/miss indicator in response thereto. Second comparison circuitry (414-420) can be configured to compare each bit of the one or more bits of the first entry to a corresponding bit of the one or more bits of the second entry and to provide a fault indicator in response thereto. The fault indicator can indicate a fault when a mismatch occurs between the first entry and the second entry.

In another aspect, the one or more bits of the of the first entry can comprise a first set of data bits and a first set of mask bits. Each data bit of the first set of data bits can have a corresponding mask bit of the first set of mask bits. The one or more bits of the of the second entry comprises a second set of data bits and a second set of mask bits. Each data bit of the second set of data bits has a corresponding mask bit of the second set of mask bits.

In another aspect, the one or more bits of the first entry can comprise a plurality of bit groups. Each bit group of the plurality of bit groups corresponds to a bit location. The bits of the bit groups encodes data information and mask information for the bit location.

In another aspect, the first entry is one of a plurality of primary entries of the CAM and the second entry is one of a plurality of shadow entries of the CAM. Each of the primary entries can have a corresponding shadow entry. The CAM can further comprise write circuitry (102) configured to store write data into a selected primary entry of the plurality of entries. When the write circuitry stores write data to a selected primary entry of the plurality of primary entries, the write circuitry can be configured to store the write data to the shadow entry corresponding to the selected primary entry. The write data comprises data information and mask information.

In another aspect, the hit/miss indicator can indicate a miss when a mismatch occurs between the data information and the mask information of the first entry and the comparand.

This disclosure is presented to enable one of ordinary skill in the art to make and use the present disclosure as provided within the context of a particular application and its requirements. Various modifications to the preferred embodiments will, however, be apparent to one skilled in the art, and the general principles defined herein may be applied to other embodiments. Therefore, the present disclosure is not intended to be limited to the particular embodiments shown and described herein, but is to be accorded the widest scope consistent with the principles and novel features herein disclosed.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of systems disclosed herein are circuitry located on a single integrated circuit or within a same device. Alternatively, the systems may include any number of separate integrated circuits or separate devices interconnected with each other. Also for example, a system or portions thereof may be soft or code representations of physical circuitry or of logical representations convertible into physical circuitry. As such, a system may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the present disclosure has been described in considerable detail with reference to certain preferred versions thereof, other versions and variations are possible and contemplated. Those skilled in the art should appreciate that they can readily use the disclosed conception and specific embodiments as a basis for designing or modifying other structures for carrying out the same purposes of the present disclosure without departing from the scope of the disclosure as defined by the appended claims.

What is claimed is:

1. A content addressable memory (CAM), comprising:
a first entry, the first entry comprising one or more bits;
a second entry, the second entry comprising one or more bits;
first comparison circuitry configured to compare each bit of a comparand to a corresponding bit of the one or more bits of the first entry and to provide a hit/miss indicator in response thereto;
second comparison circuitry configured to compare each bit of the one or more bits of the first entry to a corresponding bit of the one or more bits of the second entry and to provide a fault indicator in response thereto, wherein the first comparison circuitry and the second comparison circuitry are configured to concurrently provide the fault indicator and hit/miss indicator in response to a comparand received by the first comparison circuitry; and
taking corrective action in the CAM based on the fault indicator.

2. The CAM of claim 1, wherein the fault indicator indicates a fault when a mismatch occurs between the first entry and the second entry.

3. The CAM of claim 1, wherein the second comparison circuitry comprises a plurality of comparators, each comparator having a first input coupled to a data node of a bit location of the first entry, a second input coupled to a data node of a corresponding bit location of the second entry, and is configured to discharge the fault indicator when a mismatch occurs between the bit location of the first entry and the bit location of the second entry.

4. The CAM of claim 3, wherein each comparator is configured to not discharge the fault indicator when a mismatch does not occur between the bit location of the first entry and the bit location of the second entry.

5. The CAM of claim 1, wherein the first comparison circuitry comprises a plurality of comparators, each comparator having a first input coupled to a data node of a bit location of the first entry and a second input coupled to a bit location of the comparand, and is configured to discharge the hit/miss indicator when a mismatch occurs between the bit location of the first entry and the bit location of the comparand.

6. The CAM of claim 1, wherein the one or more bits of the first entry comprises data and mask information, and the one or more bits of the second entry comprises data and mask information.

7. The CAM of claim 6, wherein the first comparison circuitry is configured to compare each bit of the comparand to a corresponding bit of the one or more bits as selected by the mask information to provide the hit/miss indicator in response thereto.

8. The CAM of claim 1, wherein the first entry is one of a plurality of primary entries of the CAM and the second entry is one of a plurality of shadow entries of the CAM, wherein each of the primary entries has a corresponding shadow entry, the CAM further comprising:
 write circuitry configured to store write data into a selected primary entry of the plurality of entries, wherein when the write circuitry stores write data to a selected primary entry of the plurality of primary entries, the write circuitry is configured to store the write data to the shadow entry corresponding to the selected primary entry.

9. The CAM of claim 1, wherein the first comparison circuitry is configured as one of a NOR and a NAND configuration.

10. In a content addressable memory (CAM) comprising a plurality of primary entries each comprising one or more primary bits and a plurality of shadow entries each comprising one or more shadow bits, wherein each primary entry has a corresponding shadow entry, a method comprises:
 receiving a comparand;
 comparing each bit of the comparand to a corresponding bit of the one or more primary bits of a first primary entry of the plurality of primary entries;
 comparing each bit of the one or more primary bits of the first primary entry to a corresponding bit of the one or more shadow bits of a first shadow entry of the plurality of shadow entries, wherein the steps of comparing are performed concurrently;
 providing a match indicator corresponding to the first primary entry in response to the comparing each bit of the comparand to the corresponding bit of the one or more primary bits of the first primary entry to indicate whether a match occurred between the first primary entry and the comparand;
 providing a fault indicator corresponding to the first shadow entry in response to the comparing each bit of the one or more primary bits of the first primary entry to the corresponding bit of the one or more shadow bits of the first shadow entry to indicate a fault when a mismatch occurs between the first shadow entry and the first primary entry; and
 correcting the first primary entry or the first shadow entry when the fault is indicated.

11. The method of claim 10, wherein the providing the fault indicator comprises discharging the fault indicator in response to a mismatch between the first shadow entry and the first primary entry and wherein the providing the match indicator comprises discharging the match indicator in response to a mismatch between the first primary entry and the comparand.

12. The method of claim 10, further comprising:
 receiving write data;
 selecting a primary entry of the plurality of primary entries;
 storing the received write data to the selected primary entry; and
 storing the received write data to the shadow entry corresponding to the selected primary entry.

13. The method of claim 10, wherein each primary entry includes data information and mask information and each shadow entry includes data information and mask information, wherein the comparing each bit of the comparand to a corresponding bit of the one or more primary bits of a first primary entry of the plurality of primary entries is performed such that the one or more primary bits of the first primary entry is indicated by the mask information.

14. A content addressable memory (CAM), comprising:
 a first entry, the first entry comprising one or more bits, wherein the first entry comprises data information and mask information;
 a second entry, the second entry comprising one or more bits, wherein the second entry is configured to store data information and mask information;
 first comparison circuitry configured to compare a comparand to the first entry and to provide a hit/miss indicator in response thereto;
 second comparison circuitry configured to compare each bit of the one or more bits of the first entry to a corresponding bit of the one or more bits of the second entry and to provide a fault indicator in response thereto, wherein the fault indicator indicates a fault when a mismatch occurs between the first entry and the second entry, wherein the first comparison circuitry and the second comparison circuitry are configured to concurrently provide the fault indicator and hit/miss indicator in response to the comparand received by the first comparison circuitry; and
 the first entry or the second entry is corrected in response to the fault indicator.

15. The CAM of claim 14, herein:
 the one or more bits the of the first entry comprises a first set of data bits and a first set of mask bits, wherein each data bit of the first set of data bits has a corresponding mask bit of the first set of mask bits; and
 the one or more bits of the of the second entry comprises a second set of data bits and a second set of mask bits, wherein each data bit of the second set of data bits has a corresponding mask bit of the second set of mask bits.

16. The CAM of claim 14, wherein the one or more bits of the first entry comprises a plurality of bit groups, wherein each bit group of the plurality of bit groups corresponds to a bit location and wherein the bits of the bit groups encodes data information and mask information for the bit location.

17. The CAM of claim 14, wherein the first entry is one of a plurality of primary entries of the CAM and the second entry is one of a plurality of shadow entries of the CAM, wherein each of the primary entries has a corresponding shadow entry, the CAM further comprising:
 write circuitry configured to store write data into a selected primary entry of the plurality of entries, wherein when the write circuitry stores write data to a selected primary entry of the plurality of primary entries, the write circuitry is configured to store the write data to the shadow entry corresponding to the selected primary entry, and wherein the write data comprises data information and mask information.

18. The CAM of claim 14, wherein the hit/miss indicator indicates a miss when a mismatch occurs between the data information and the mask information of the first entry and the comparand.

\* \* \* \* \*